US012665328B2

(12) United States Patent
He et al.

(10) Patent No.: US 12,665,328 B2
(45) Date of Patent: Jun. 23, 2026

(54) SMALL-SIZED CONNECTOR CONVENIENT FOR DISMOUNTING AND MOUNTING

(71) Applicant: Shenzhen Alex Connector Co Ltd, Shenzhen (CN)

(72) Inventors: Xiling He, Shenzhen (CN); Huilin Wu, Shenzhen (CN); Jijian Wei, Shenzhen (CN); Haiqiu Lu, Shenzhen (CN); Xiao'an Wang, Shenzhen (CN); Xiaobin Wang, Shenzhen (CN); Jun Yang, Shenzhen (CN); Zhaoyang Tang, Shenzhen (CN); Di Jiang, Shenzhen (CN); Mingliang Xia, Shenzhen (CN); Junzhong Liu, Shenzhen (CN)

(73) Assignee: Shenzhen Alex Connector Co Ltd, Shenzhen (CN)

( * ) Notice: Subject to any disclaimer, the term of this patent is extended or adjusted under 35 U.S.C. 154(b) by 314 days.

(21) Appl. No.: 18/399,925

(22) Filed: Dec. 29, 2023

(65) Prior Publication Data

US 2025/0079734 A1 Mar. 6, 2025

(30) Foreign Application Priority Data

Aug. 31, 2023 (CN) ......................... 202322402227.6

(51) Int. Cl.
*H01R 12/70* (2011.01)
*H01R 12/71* (2011.01)
*H01R 13/15* (2006.01)
*H01R 13/627* (2006.01)
*H01R 13/633* (2006.01)

(52) U.S. Cl.
CPC ....... *H01R 12/7029* (2013.01); *H01R 12/716* (2013.01); *H01R 13/15* (2013.01); *H01R 13/6272* (2013.01); *H01R 13/6335* (2013.01)

(58) Field of Classification Search
CPC ........................ H01R 13/6275; H01R 13/6335
See application file for complete search history.

(56) References Cited

U.S. PATENT DOCUMENTS 4,621,885 A * 11/1986 Szczesny ............. H01R 12/675 439/357
4,735,583 A * 4/1988 Rudy, Jr. .............. H01R 13/518 439/350
6,585,536 B1 * 7/2003 Wu .................... H01R 13/6275 439/358

(Continued)

*Primary Examiner* — Oscar C Jimenez

(57) ABSTRACT

The utility model discloses a small-sized connector convenient for dismounting and mounting, the connector being inserted and received in a female socket of a PCB board, comprising: a connector housing inserted and received in the female socket; two elastic clamping plates, wherein the two elastic clamping plates are symmetrically mounted on both sides of the connector housing, first ends of the two elastic clamping plates are each provided with a clamping hole, and the female socket is provided with a clamping boss clamped with the clamping hole; and a pull strap, wherein both ends of the pull strap are respectively connected to second ends of the two elastic clamping plates, and the pull strap is used to pull the second ends of the two elastic clamping plates to separate the clamping holes at the first ends of the two elastic clamping plates from the clamping bosses of the female socket.

9 Claims, 4 Drawing Sheets

(56) References Cited

U.S. PATENT DOCUMENTS

| | | | | |
|---|---|---|---|---|
| 11,322,887 | B2 | 5/2022 | Hsu et al. | |
| 2003/0148647 | A1 * | 8/2003 | Hisamatsu | H01R 13/6273 439/258 |
| 2011/0189869 | A1 | 8/2011 | Li | |
| 2021/0075158 | A1 | 3/2021 | Hsu et al. | |
| 2023/0204141 | A1 | 6/2023 | Chen et al. | |

* cited by examiner

SMALL-SIZED CONNECTOR CONVENIENT FOR DISMOUNTING AND MOUNTING

CROSS-REFERENCE TO RELATED APPLICATIONS

The application claims priority of Chinese patent application CN 202322402227.6, filed on Aug. 31, 2023, which is incorporated herein by reference in its entireties.

TECHNICAL FIELD

The present utility model relates to the technical field of connectors, and in particular to a small-sized connector convenient for dismounting and mounting.

BACKGROUND

A connector is a common component that is used for bridging communication between blocked or isolated circuits in a circuitry, so as to allow a current to flow therethrough and enable the circuitry to realize a predetermined function. The connector is an indispensable component in an electronic device, and there are various types of connectors depending on the application object, frequency, power, application environment, and the like.

It is common for an existing connector to be inserted and received in a female socket on a PCB board. However, it is usually required to mount more connectors on a PCB board, and the interval between two adjacent connectors is small. Therefore, when an existing connector is to be dismounted, the operating space left for a user is very small, making it difficult to perform the dismounting, which affects the subsequent maintenance and use.

SUMMARY

A primary objective of the present utility model is to provide a small-sized connector convenient for dismounting and mounting, which aims to improve the structure of the connector and facilitate the mounting and dismounting of the connector.

In order to achieve the above objective, the present utility model provides a small-sized connector convenient for dismounting and mounting, the connector being inserted and received in a female socket of a PCB board, comprising:

a connector housing inserted and received in the female socket;

two elastic clamping plates, wherein the two elastic clamping plates are symmetrically mounted on both sides of the connector housing, first ends of the two elastic clamping plates are each provided with a clamping hole, and the female socket is provided with a clamping boss clamped with the clamping hole; and a pull strap, wherein both ends of the pull strap are respectively connected to second ends of the two elastic clamping plates, and the pull strap is used to pull the second ends of the two elastic clamping plates to separate the clamping holes at the first ends of the two elastic clamping plates from the clamping bosses of the female socket.

Optionally, the elastic clamping plate comprises a clamping plate body, two connecting parts connected to the connector housing are symmetrically arranged on both sides of the clamping plate body, the two connecting parts are each connected to the clamping plate body through a connecting arm, and the two connecting arms are symmetrically arranged in a splayed shape.

Optionally, the connecting part is provided as a rectangular plate structure, the connector housing is provided with a sliding groove for mounting the connecting part, a side wall of the sliding groove is provided with a first hole communicated with the sliding groove, the connecting part is provided with a second hole docked with the first hole, and the first hole and the second hole are fixed by inserting and receiving a fixing pin.

Optionally, the clamping plate body, the connecting part and the connecting arm are provided as an integrated structure.

Optionally, the first end of the elastic clamping plate is provided with an inclined guide surface.

Optionally, the clamping boss comprises an arc-shaped guide surface for guiding the first end of the elastic clamping plate, and a clamping surface for clamping with the clamping hole. Optionally, the pull strap is connected to a T-shaped handle.

Optionally, a plurality of metal partition plates are mounted on an inner side of the female socket, the metal partition plates form a plurality of accommodating spaces for accommodating elastic pieces of the connector respectively, and the metal partition plates are connected to ground wires of the connector.

Optionally, the metal partition plate is provided as a copper plate or a stainless steel plate.

The present utility model has the beneficial effects that: the structure of the existing connector is improved by symmetrically mounting two elastic clamping plates outside the connector, connecting the clamping hole at the first end of the elastic clamping plate to the clamping boss on the female socket, and meanwhile, connecting the second ends of the two elastic clamping plates through a pull strap, such that when dismounting the connector, it is only required to pull the pull strap with hands, to rotate the second ends of the two elastic clamping plates relative to each other, and therefore to allow the first ends of the two elastic clamping plates to be opened relative to each other, such that the clamping of the clamping hole and the clamping boss is released, and the connector can be quickly pulled out, which solves the problems of small mounting space and inconvenience of manual pulling and inserting in the existing connector.

BRIEF DESCRIPTION OF DRAWINGS

To more clearly illustrate the technical solutions in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

Figure 1:
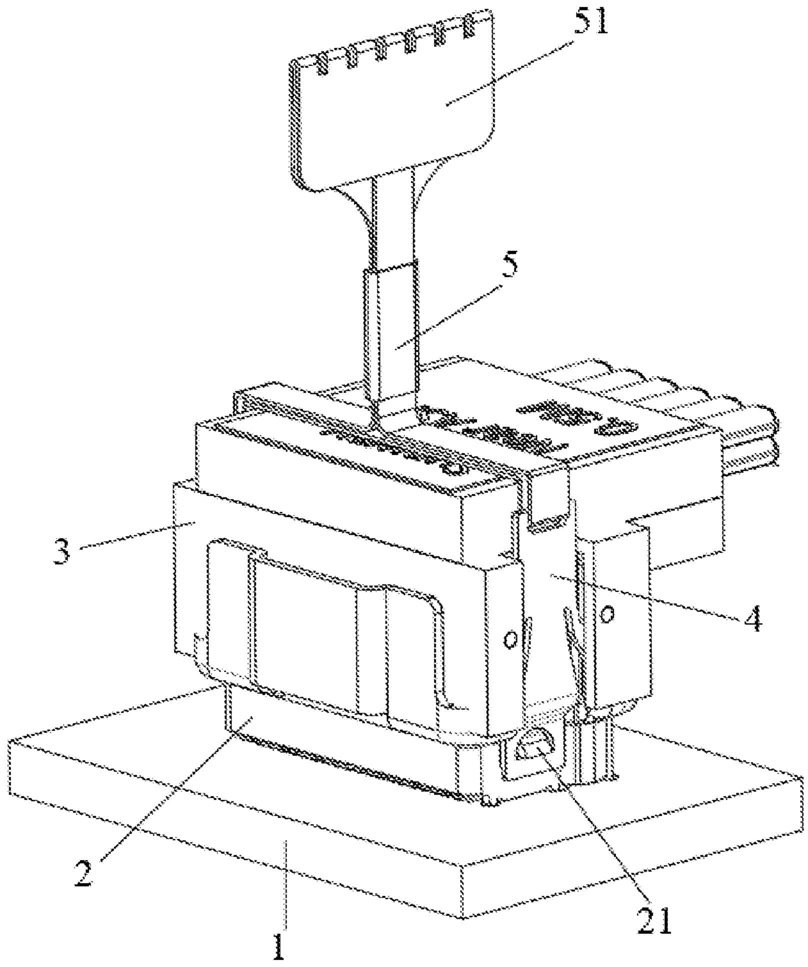
FIG. 1 is a schematic diagram of a structure of a connector connected to a female socket according to the present utility model.
Figure 2:
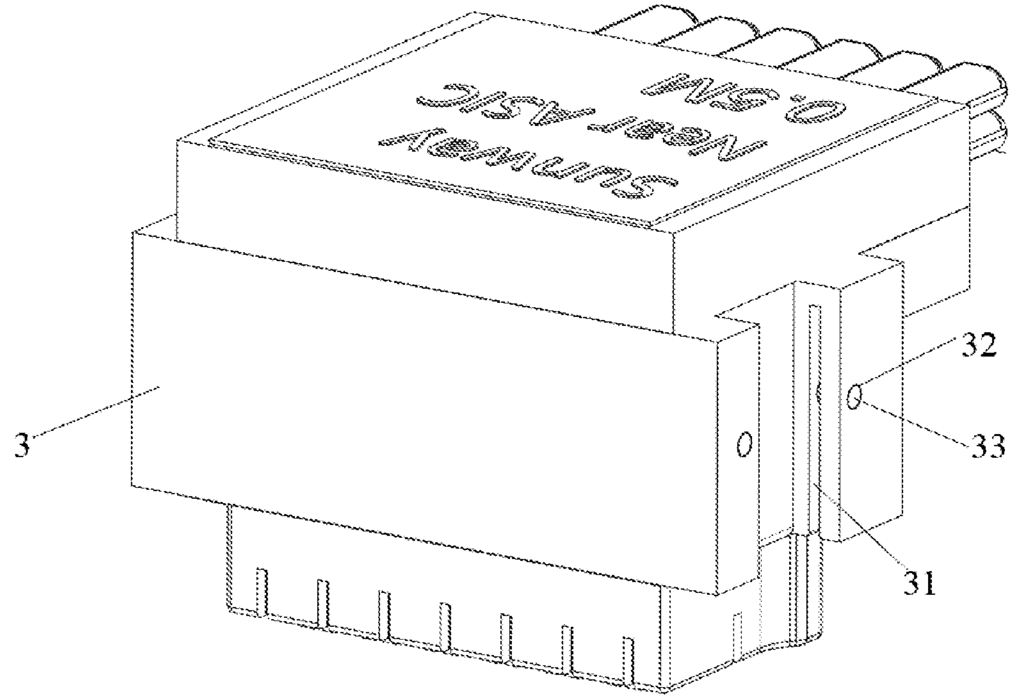
FIG. 2 is a schematic diagram of a connector housing according to the present utility model.

The realization of the objectives, the functional features, and the advantages of the present utility model will be further explained in conjunction with the embodiments and with reference to the drawings.

DETAILED DESCRIPTION OF EMBODIMENTS

The technical solutions in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front and rear) are involved in the embodiments of the present utility model, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present utility model, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present utility model.

Referring to FIG. 1, an embodiment of the present utility model provides a small-sized connector convenient for dismounting and mounting, the connector being inserted and received in a female socket 2 of a PCB board 1, comprising:

a connector housing 3 inserted and received in the female socket 2;

two elastic clamping plates 4, wherein the two elastic clamping plates 4 are symmetrically mounted on both sides of the connector housing 3, first ends of the two elastic clamping plates 4 are each provided with a clamping hole 41, and the female socket 2 is provided with a clamping boss 21 clamped with the clamping hole 41; and a pull strap 5, wherein both ends of the pull strap 5 are respectively connected to second ends of the two elastic clamping plates 4, and the pull strap 5 is used to pull the second ends of the two elastic clamping plates 4 to separate the clamping holes 41 at the first ends of the two elastic clamping plates 4 from the clamping bosses 21 of the female socket 2.

It should be noted that, it is common to connect a plurality of connectors on the PCB board 1, and two adjacent connectors are closely arranged, such that when a connector is to be dismounted, the operating space for both hands of an operator is limited, and the connector can only be dismounted by pulling a wire connected to the connector, which may easily cause damage to the connector; in this embodiment, the structure of the existing connector is improved by symmetrically mounting two elastic clamping plates 4 outside the connector, connecting the clamping hole 41 at the first end of the elastic clamping plate 4 to the clamping boss 21 on the female socket 2, and meanwhile, connecting the second ends of the two elastic clamping plates 4 through a pull strap 5, and extending the pull strap 5 outside the connector, such that when dismounting the connector, it is only required to pull the pull strap 5 with hands, to rotate the second ends of the two elastic clamping plates 4 relative to each other, and therefore to allow the first ends of the two elastic clamping plates 4 to be opened relative to each other, such that the clamping of the clamping hole 41 and the clamping boss 21 is released, and the connector can be quickly pulled out, which solves the problems of small mounting space and inconvenience of manual pulling and inserting in the existing connector.

Figure 3:
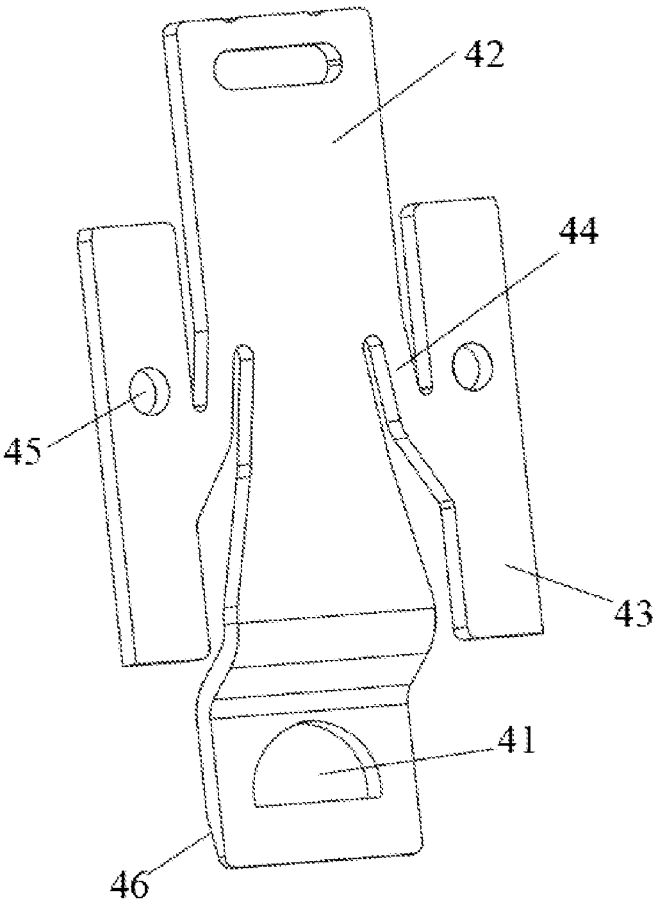
FIG. 3 is a schematic diagram of a structure of an elastic clamping plate according to the present utility model.

Further, referring to FIG. 3, the elastic clamping plate 4 comprises a clamping plate body 42, two connecting parts 43 connected to the connector housing 3 are symmetrically arranged on both sides of the clamping plate body 42, the two connecting parts 43 are each connected to the clamping plate body 42 through a connecting arm 44, and the two connecting arms 44 are symmetrically arranged in a splayed shape.

In this embodiment, the structure of the elastic clamping plate 4 is further optimized. The clamping plate body 42 is provided as a cuboid-shaped structure in which one end is provided with the clamping hole 41 to be clamped with the clamping boss 21 on the female socket 2, and the other end is connected to the pull strap 5, both sides of a middle part of the clamping plate body 42 are each provided with a connecting arm 44, the two connecting arms 44 extend in a splayed shape and are provided with a connecting part 43 for being connected to the connector housing 3 at one end, such that since the connecting parts 43 are fixed, both ends of the clamping plate body 42 can be rotated under the elastic deformation of the connecting arms 44. Specifically, when an operator pulls the pull strap 5, the second end of the clamping plate body 42 is forced to rotate towards one side in proximity to the connector housing 3, and at this point, the connecting arm 44 is equivalent to a rotating shaft for rotating the clamping plate body 42 based on the deformation of the rotating shaft, and in this way, the first end of the clamping plate body 42 will be rotated in a direction away from the connector housing 3 (and therefore, the clamping boss 21), such that the clamping force of the clamping hole and the clamping boss 21 can be released, and the connector can be easily pulled out from the female socket 2.

Further, the connecting part 43 is provided as a rectangular plate structure, the connector housing 3 is provided with a sliding groove 31 for mounting the connecting part 43, a side wall of the sliding groove 31 is provided with a first hole 32 communicated with the sliding groove 31, the connecting part 43 is provided with a second hole 45 docked with the first hole 32, and the first hole 32 and the second hole 45 are fixed by inserting and receiving a fixing pin 33.

In this embodiment, the elastic clamping plate 4 is detachably mounted on the connector housing 3, to facilitate the replacement of the elastic clamping plate 4 after being used for a long time. Specifically, the elastic clamping plate 4 is slidably inserted into the sliding groove 31 of the connector housing 3 through the connecting part 43, and when the second hole 45 of the connecting part 43 corresponds to the first hole 32 on the side wall of the sliding groove 31, the fixing pin 33 is inserted to limit the two holes, such that the elastic clamping plate 4 can be stably mounted on the connector housing 3.

Further, the clamping plate body 42, the connecting part 43 and the connecting arm 44 are provided as an integrated structure, and the elastic clamping plate 4 takes the form of an integrated structure, which realizes a convenient manufacturing, a simplified manufacturing process, a reduced manufacturing cost, and a greatly improved production efficiency.

Further, the first end of the elastic clamping plate 4 is provided with an inclined guide surface 46. In this embodiment, the inclined guide surface 46 is arranged in proximity to one side that is of the elastic clamping plate 4 and that is in proximity to the clamping boss 21. During the process of clamping the elastic clamping plate 4 with the clamping boss 21, the inclined guide surface 46 first contacts the clamping boss 21, and during the process of pressing the elastic clamping plate 4 downwards, that is, inserting the connector into the female socket 2, the inclined guide surface prevents the elastic clamping plate 4 from being stuck with the clamping boss 21 and thus causing the connector to fail to be inserted into the female socket 2 smoothly.

Figure 4:
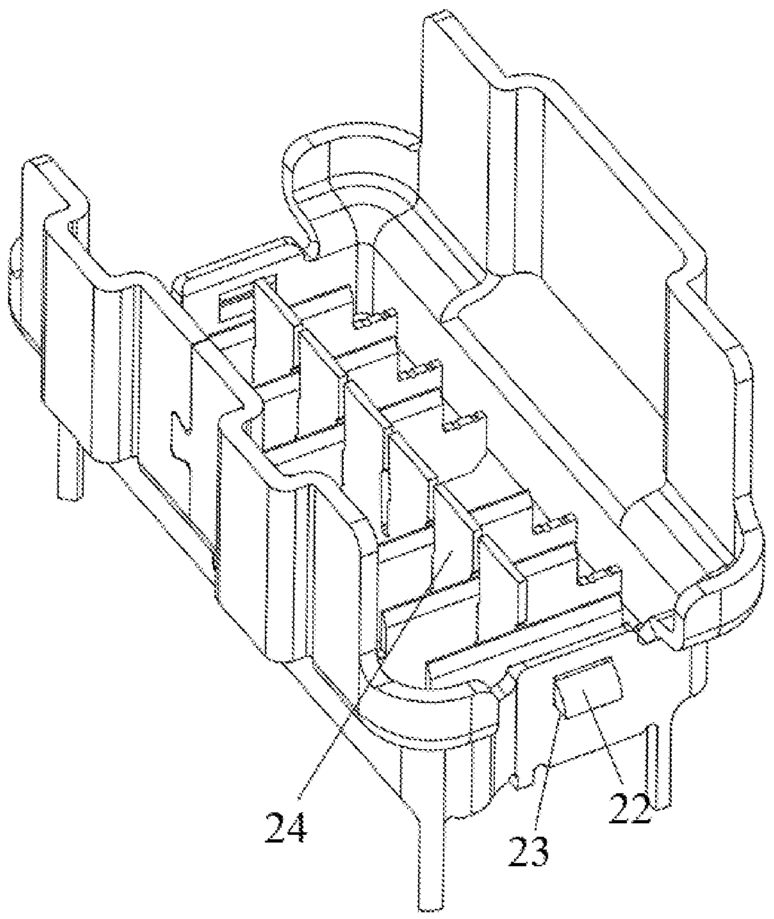
FIG. 4 is a schematic diagram of a structure of a female socket according to the present utility model.

Further, referring to FIG. 4, the clamping boss 21 comprises an arc-shaped guide surface 22 for guiding the first end of the elastic clamping plate 4, and a clamping surface 23 for clamping with the clamping hole 41. In this embodiment, the arc-shaped guide surface corresponds to the inclined guide surface 46 of the elastic clamping plate 4, and the two surfaces function to guide each other, and therefore guide the elastic clamping plate 4, such that the connector is facilitated to be inserted into the female socket 2. When the connector is inserted into the female socket 2 in place, the clamping surface 23 of the clamping boss 21 is clamped with the clamping hole 41 of the elastic clamping plate 4, to effectively limit the connector and the female socket 2.

Further, a plurality of metal partition plates 24 are mounted on an inner side of the female socket 2, the metal partition plates 24 form a plurality of accommodating spaces for accommodating elastic pieces of the connector respectively, and the metal partition plates 24 are connected to ground wires of the connector. It should be noted that, after the connector is inserted into the female socket 2, the accommodating spaces of the metal partition plates 24 provide an independent space for each group of the elastic pieces of the connector, and the metal partition plates 24 are connected to the ground wires of the connector, which can form an independent closed space for each group of the elastic pieces after the connector is powered on, such that signal dispersion is effectively prevented, and signal interference is avoided between two adjacent groups of the elastic pieces.

Further, the metal partition plate 24 is provided as a copper plate or a stainless steel plate, to facilitate connection and conduction with the ground wire and further improve the structural stability.

Further, the pull strap 5 is connected to a T-shaped handle 51 to facilitate the operation of an operator. It is only required to hold the T-shaped handle 51 to pull the pull strap 5 to pull the connector out.

The above mentioned contents are only optional embodiments of the present utility model and are not intended to limit the patent scope of the present utility model, and under the utility model concept of the present utility model, the equivalent structural transformations made by using the contents of the specification and the drawings of the present utility model, or direct/indirect applications to other related technical fields, are all included in the patent protection scope of the present utility model.

The invention claimed is:

1. A small-sized connector convenient for dismounting and mounting, the connector being inserted and received in a female socket of a PCB board, comprising:

a connector housing inserted and received in the female socket;

two elastic clamping plates, wherein the two elastic clamping plates are symmetrically mounted on both sides of the connector housing, first ends of the two elastic clamping plates are each provided with a clamping hole, and the female socket is provided with a clamping boss clamped with the clamping hole; and a pull strap, wherein both ends of the pull strap are respectively connected to second ends of the two elastic clamping plates, and the pull strap is used to pull the second ends of the two elastic clamping plates to separate the clamping holes at the first ends of the two elastic clamping plates from the clamping bosses of the female socket;

wherein a plurality of metal partition plates are mounted on an inner side of the female socket, the metal partition plates form a plurality of accommodating spaces for accommodating elastic pieces of the connector respectively, and the metal partition plates are connected to ground wires of the connector.

2. The small-sized connector convenient for dismounting and mounting according to claim 1, wherein the elastic clamping plate comprises a clamping plate body, two connecting parts connected to the connector housing are symmetrically arranged on both sides of the clamping plate body, the two connecting parts are each connected to the clamping plate body through a connecting arm, and the two connecting arms are symmetrically arranged in a splayed shape.

3. The small-sized connector convenient for dismounting and mounting according to claim 2, wherein the connecting part is provided as a rectangular plate structure, the connector housing is provided with a sliding groove for mounting the connecting part, a side wall of the sliding groove is provided with a first hole communicated with the sliding groove, the connecting part is provided with a second hole docked with the first hole, and the first hole and the second hole are fixed by inserting and receiving a fixing pin.

4. The small-sized connector convenient for dismounting and mounting according to claim 2, wherein the clamping plate body, the connecting part and the connecting arm are provided as an integrated structure.

5. The small-sized connector convenient for dismounting and mounting according to claim 1, wherein the first end of the elastic clamping plate is provided with an inclined guide surface.

6. The small-sized connector convenient for dismounting and mounting according to claim 5, wherein the clamping boss comprises an arc-shaped guide surface for guiding the first end of the elastic clamping plate, and a clamping surface for clamping with the clamping hole.

7. The small-sized connector convenient for dismounting and mounting according to claim 1, wherein the pull strap is connected to a T-shaped handle.

8. The small-sized connector convenient for dismounting and mounting according to claim 1, wherein the metal partition plate is provided as a copper plate or a stainless steel plate.

9. A small-sized connector convenient for dismounting and mounting, the connector being inserted and received in a female socket of a PCB board, comprising:

a connector housing inserted and received in the female socket;

two elastic clamping plates, wherein the two elastic clamping plates are symmetrically mounted on both sides of the connector housing, first ends of the two elastic clamping plates are each provided with a clamping hole, and the female socket is provided with a clamping boss clamped with the clamping hole; and a pull strap, wherein both ends of the pull strap are respectively connected to second ends of the two elastic clamping plates, and the pull strap is used to pull the second ends of the two elastic clamping plates to separate the clamping holes at the first ends of the two elastic clamping plates from the clamping bosses of the female socket;

wherein the elastic clamping plate comprises a clamping plate body, two connecting parts connected to the connector housing are symmetrically arranged on both sides of the clamping plate body, the two connecting parts are each connected to the clamping plate body through a connecting arm, and the two connecting arms are symmetrically arranged in a splayed shape;

wherein the connecting part is provided as a rectangular plate structure, the connector housing is provided with a sliding groove for mounting the connecting part, a side wall of the sliding groove is provided with a first hole communicated with the sliding groove, the connecting part is provided with a second hole docked with the first hole, and the first hole and the second hole are fixed by inserting and receiving a fixing pin.

* * * * *